(12) United States Patent
Murota et al.

(10) Patent No.: US 9,757,835 B2
(45) Date of Patent: Sep. 12, 2017

(54) TOOL CHANGER WITH COVER MEANS

(71) Applicant: FANUC Corporation, Yamanashi (JP)

(72) Inventors: Masahiro Murota, Yamanashi (JP); Guanghui Li, Yamanashi (JP); Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 120 days.

(21) Appl. No.: 14/584,423

(22) Filed: Dec. 29, 2014

(65) Prior Publication Data

US 2015/0190897 A1 Jul. 9, 2015

(30) Foreign Application Priority Data

Jan. 8, 2014 (JP) .................. 2014-002014

(51) Int. Cl.
*B23Q 3/157* (2006.01)
*B23Q 11/08* (2006.01)
*B23Q 3/155* (2006.01)

(52) U.S. Cl.
CPC .............. *B23Q 11/08* (2013.01); *B23Q 3/155* (2013.01); *B23Q 3/15534* (2016.11); *B23Q 3/15706* (2013.01); *Y10T 483/115* (2015.01); *Y10T 483/1795* (2015.01); *Y10T 483/19* (2015.01)

(58) Field of Classification Search
CPC .......... Y10T 483/115; Y10T 483/1752; Y10T 483/1755; Y10T 483/1757; Y10T 483/176; Y10T 483/179; Y10T 483/1793; Y10T 483/1795; Y10T 483/1798; Y10T 483/1882; Y10S 483/90; B23Q 3/155–3/15793; B23Q 11/08–11/0891

USPC .............. 483/3, 54–57, 38–41, 67, 900
See application file for complete search history.

(56) References Cited

U.S. PATENT DOCUMENTS

| | | | | |
|---|---|---|---|---|
| 5,499,963 | A | * 3/1996 | Fujimoto | B23Q 3/15706 483/54 |
| 2005/0009679 | A1 | 1/2005 | Fujimoto et al. | |
| 2005/0032615 | A1 | 2/2005 | Sato et al. | |
| 2006/0094575 | A1 | 5/2006 | Fujimoto et al. | |
| 2014/0256527 | A1* | 9/2014 | Liu | B23Q 3/15706 483/54 |

(Continued)

FOREIGN PATENT DOCUMENTS

| | | |
|---|---|---|
| JP | 63-186538 U | 11/1988 |
| JP | H05-38651 A | 2/1993 |

(Continued)

OTHER PUBLICATIONS

Machine Translation of JP 2006-305663, which JP '663 was published Nov. 2006.*

(Continued)

*Primary Examiner* — Erica E Cadugan
(74) *Attorney, Agent, or Firm* — Hauptman Ham, LLP

(57) ABSTRACT

A tool changer comprises a turret with a plurality of grips for holding tools such that the turret is turned to index a desired tool to change the tools. The front and rear surfaces of the turret are covered by front and rear covers, respectively. A projection or a recess which defines a passage for cutting fluid is formed in an outer rear surface portion of the rear cover at portions above and/or on each lateral side of a turret mechanism portion.

10 Claims, 6 Drawing Sheets

(56) References Cited

U.S. PATENT DOCUMENTS

| | | | | |
|---|---|---|---|---|
| 2015/0087487 A1* | 3/2015 | Murota | .............. | B23Q 3/15773 483/3 |
| 2015/0105229 A1* | 4/2015 | Li | .......................... | B23Q 3/157 483/13 |
| 2015/0111710 A1* | 4/2015 | Murota | .................. | B23Q 3/157 483/13 |

FOREIGN PATENT DOCUMENTS

| | | |
|---|---|---|
| JP | H06-739 A | 1/1994 |
| JP | 7-24539 U | 5/1995 |
| JP | 8-118181 A | 5/1996 |
| JP | 2005-28460 A | 2/2005 |
| JP | 2005-52948 A | 3/2005 |
| JP | 2006-123116 A | 5/2006 |
| JP | 2006-305663 A | 11/2006 |
| JP | 3990441 B1 | 10/2007 |
| JP | 2007-290113 A | 11/2007 |
| JP | 2010-099766 A | 5/2010 |

OTHER PUBLICATIONS

Machine Translation of Japanese Patent Application No. 2013-217756, filed Oct. 18, 2013.*
Machine Translation of Japanese Patent Application No. 2013-199913, filed Sep. 26, 2013.*
Machine Translation of Japanese Patent Application No. 2013-215607, filed Oct. 16, 2013.*
Decision to Grant a Patent mailed Apr. 28, 2015, corresponding to Japanese patent application No. 2014-002014.

* cited by examiner

TOOL CHANGER WITH COVER MEANS

RELATED APPLICATIONS

The present application claims priority to Japanese Application Number 2014-002014, filed Jan. 8, 2014, the disclosure of which is hereby incorporated by reference herein in its entirety.

BACKGROUND OF THE INVENTION

Field of the Invention

The present invention relates to a tool changer with cover means configured to prevent foreign matter from getting into a turret.

Description of the Related Art

Tool changers are conventionally used to automatically change tools to be mounted on the spindle of a machine tool. A plurality of necessary work tools are previously set on this tool changer so that a tool specified for replacement in accordance with the machining state can be automatically mounted on the spindle of the machine tool.

Japanese Patent Applications Laid-Open Nos. 2010-99766, 5-38651, 6-739 and 2006-123116, Japanese Patent No. 3990441, etc., each disclose an example in which a machine tool is fitted with one such automatic tool changer for automatically changing tools. This tool changer comprises a turret with a plurality of grips for gripping the tools.

Conventionally, a turret is provided with cover means that prevents chips and cutting fluid from getting into the turret during workpiece machining. FIG. 11 shows an example of a conventional technique in which a tool changer comprising the turret with the cover means is attached to a machine tool.

In FIG. 11, a tool (not shown) is mounted on the distal end portion of a spindle 2 of a machine tool 1. Further, a Z-axis motor 3 is connected to the spindle 2 by a Z-axis ball screw so that the spindle 2 can be driven vertically by the Z-axis motor 3. Furthermore, the tool changer is provided with a turret 6 for use as a member for changing the tool.

The spindle 2 is provided with a turret cam 4 and a cam follower 5, whereby the angle of the turret 6 can be changed. The turret 6 comprises a turret mechanism portion 604 and a turret-inside mechanism portion 606, whereby the turret 6 can be rotated.

Further, a front cover 601 and a rear cover 602 are provided on the front and rear sides, respectively, of the turret 6, in order to prevent chips and cutting fluid from getting into the turret-inside mechanism portion 606 and adversely affecting it. The rear cover 602 comprises a truncated-cone portion 605 and an outer rear surface portion 603 behind it.

Since the turret cam 4 is provided on the spindle 2 in this tool changer, the turret 6 is subjected to a swinging motion by the cam follower 5 that follows the turret cam 4 as the Z-axis motor 3 is driven to move the spindle 2 vertically.

In the conventional automatic tool changers disclosed in the patent documents described above, the turret is fitted with a plurality of tools and is indexed to change a tool mounted on the spindle, so that the tool change can be performed rapidly and accurately. Since the front side of the turret and a turret base are only connected by simply providing a gap between them, the cutting fluid and chips produced during machining may possibly get into various parts of the turret and adversely affect them.

According to the conventional technique shown in FIG. 11, moreover, chips produced as a workpiece is machined and cutting fluid used in the machining may sometimes drop along the outer rear surface portion 603 of the rear cover 602 and get into the turret mechanism portion 604. When the turret 6 is swung, furthermore, the chips and cutting fluid collected on an upper part of the truncated-cone portion 605 of the rear cover 602 may get into the turret mechanism portion 604 in the same way.

Thus, in some cases, the rear cover of the conventional technique may not be able to fully prevent the chips and cutting fluid from getting into the turret mechanism portion 604.

SUMMARY OF THE INVENTION

Accordingly, the object of the present invention is to provide a tool changer attached to a machine tool and comprising cover means configured to prevent chips and cutting fluid from getting into a turret mechanism portion.

A tool changer according to the present invention comprises a turret with a plurality of grips for holding tools such that the turret is turned to index a desired tool to change the tools. The tool changer comprises a front cover which covers a front surface of the turret, a rear cover which comprises an outer rear surface portion and covers a rear surface of the turret, a drive source for turning the turret, and a turret mechanism portion configured to transmit a force from the drive source, thereby turning the turret. The outer rear surface portion of the rear cover is formed with a projection and/or a recess which defines a flow passage on an upper side of, or on a left and right sides of, the turret mechanism portion.

According to the tool changer of the present invention, the rear cover of the turret is provided with the projection and/or the recess which defines the flow passage, so that chips and cutting fluid adhering to the rear cover of the turret become liable to drop along the flow passage and can be prevented from flowing on the outer rear surface of the rear cover and getting into the turret mechanism portion.

In a machine tool of the type in which the turret is swung during tool change, even when chips produced as a workpiece is machined and used cutting fluid are collected on the upper side of the rear cover, they are guided along the passage by the swinging motion during the tool change. Thus, the chips and cutting fluid can be kept from getting into the turret mechanism portion.

The passage may be shaped so as to outwardly extend left and right from a transversely central portion of the rear cover as viewed from the front.

Since the passage is shaped so as to outwardly extend left and right from the transversely central portion of the rear cover as viewed from the front, according to this aspect, chips and cutting fluid flow outward as they drop along the passage. Thus, the chips and cutting fluid can be more effectively prevented from getting into the turret mechanism portion.

The cross-sectional shape of the projection or recess may be semicircular, triangular, or square.

According to the present invention, there can be provided a tool changer attached to a machine tool and comprising cover means configured to prevent chips and cutting fluid from getting into a turret mechanism portion.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A first embodiment of a tool changer according to the present invention will first be described with reference to FIGS. 1 to 6.

Figure 1:
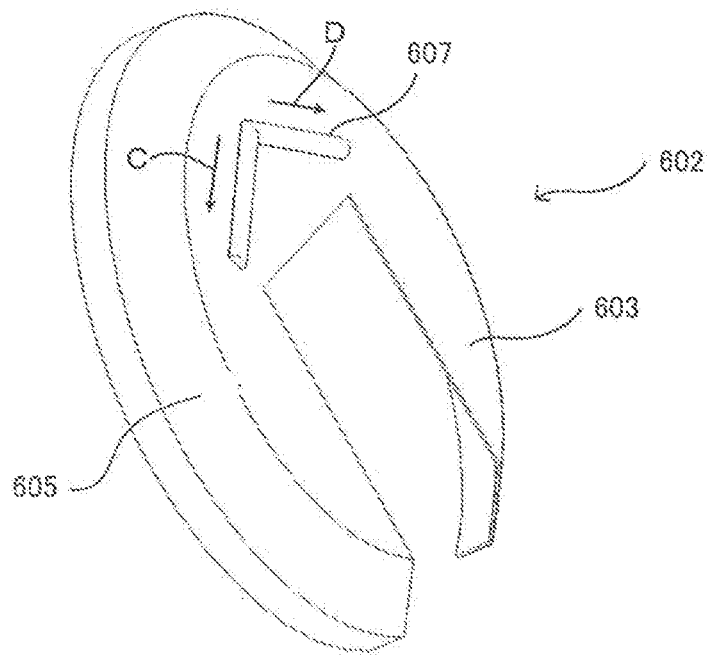
FIG. 1 is a schematic view showing an example of a rear cover constituting a turret of a first embodiment of a tool changer according to the present invention.

FIG. 1 is a view showing an example of a rear cover 602 constituting a turret of the first embodiment of the tool changer according to the present invention. A projection 607 is provided on an upper part of an outer rear surface portion 603 of the rear cover 602. The projection 607 is semicircular in cross-section, arranged so that its central portion is higher than its opposite end portions, and inverted V-shaped as a whole. Thus, chips and cutting fluid drop along a flow passage defined by the outer rear surface portion 603 and the projection 607 of the rear cover 602, as indicated by arrows C and D in FIG. 1, so that they can be prevented from getting into a turret mechanism portion 604. Also if the chips and cutting fluid are collected on an upper part of an outer truncated-cone portion 605 of the rear cover 602, in the tool changer of the type in which the turret 6 is swung during tool change, they drop along the passage indicated by arrows C and D in FIG. 1, so that they can be prevented from getting into the turret mechanism portion 604.

As described above, FIG. 1 shows the example in which the projection 607 having the semicircular cross-section is formed in the shape of an inverted V on the upper part of the outer rear surface portion 603 of the rear cover 602. However, the projection 607 is not limited to this shape and some modifications, such as those shown in FIGS. 2 to 6, can be effected.

Figure 2:
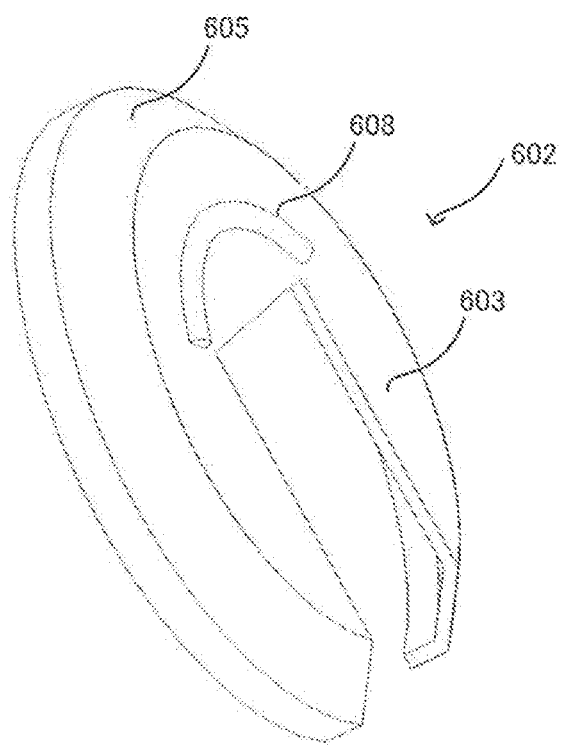
FIG. 2 is a schematic view showing a first modification of the rear cover shown in FIG. 1.

In a first modification of the rear cover 602, as shown in FIG. 2, a projection 608 having a semicircular cross-section is formed on the upper part of the outer rear surface portion 603 so that its central portion is higher than its opposite end portions, and is curved as a whole. Also in this modification, chips and cutting fluid drop outward from the central portion of the rear cover 602 (or the outer rear surface portion 603), so that they can be prevented from getting into the turret mechanism portion 604.

Figure 3:
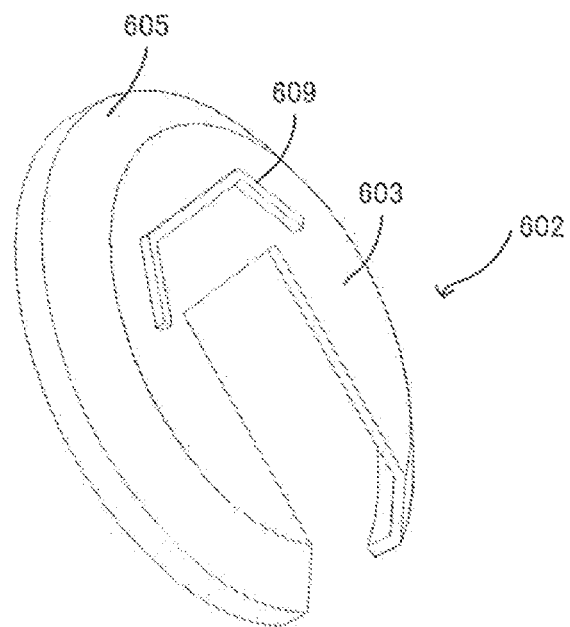
FIG. 3 is a schematic view showing a second modification of the rear cover shown in FIG. 1.

In a second modification of the rear cover 602, as shown in FIG. 3, a projection 609 having a square cross-section is formed on the upper part of the outer rear surface portion 603 so that its upper side extends horizontally and its left and right sides continuous with the upper side are declined, and is trapezoidal as a whole. Also in this modification, chips and cutting fluid drop downward along the left and right sides from the upper side of the projection 609 of the outer rear surface portion 603 of the rear cover 602 after they are temporarily collected on the upper side. Thus, the chips and cutting fluid can be prevented from getting into the turret mechanism portion 604.

Figure 4:
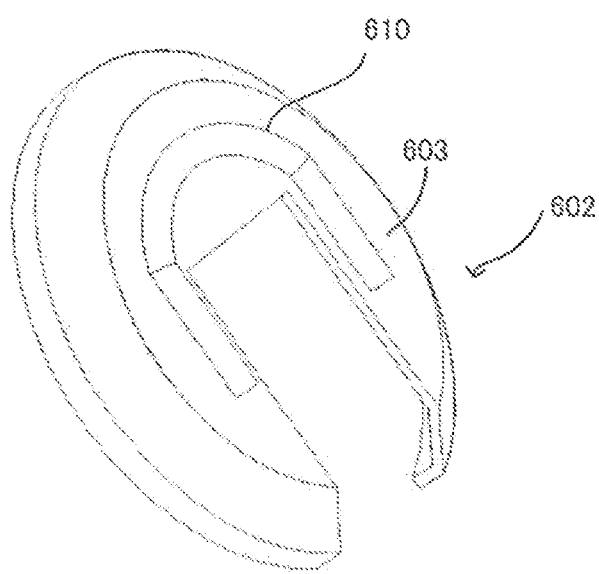
FIG. 4 is a schematic view showing a third modification of the rear cover shown in FIG. 1.
Figure 12:
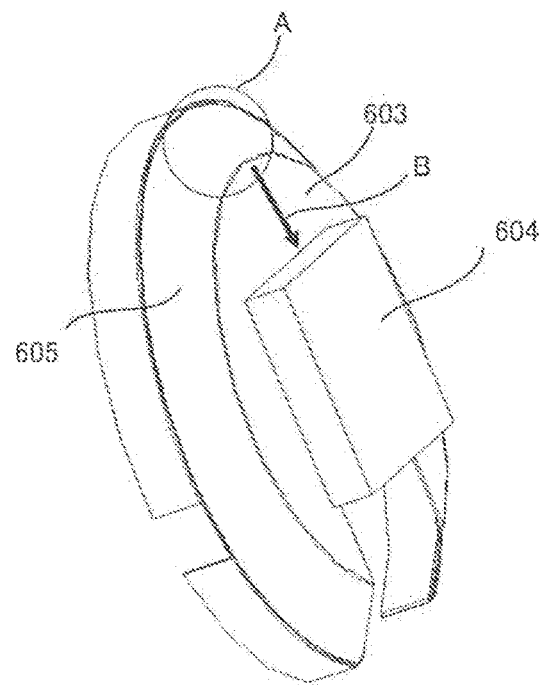
FIG. 12 is a view showing a rear cover constituting a turret of the tool changer of FIG. 11.

In a third modification of the rear cover 602, as shown in FIG. 4, an inverted U-shaped projection 610 is formed on the upper part of the outer rear surface portion 603 so as to enclose the upper, left, and right sides of the turret mechanism portion 604 (see FIG. 12). In this modification, chips and cutting fluid outwardly drop left and right from the central portion of the projection 610 of the outer rear surface portion 603 of the rear cover 602 (or a curved portion of the projection 610 above the turret mechanism portion 604). Thereafter, they are dropped along the rear cover 602 by left and right straight portions of the projection 610 (or straight portions located individually on the left and right of the turret mechanism portion 604). Thus, the chips and cutting fluid can be prevented from getting into the turret mechanism portion 604.

Figure 5:
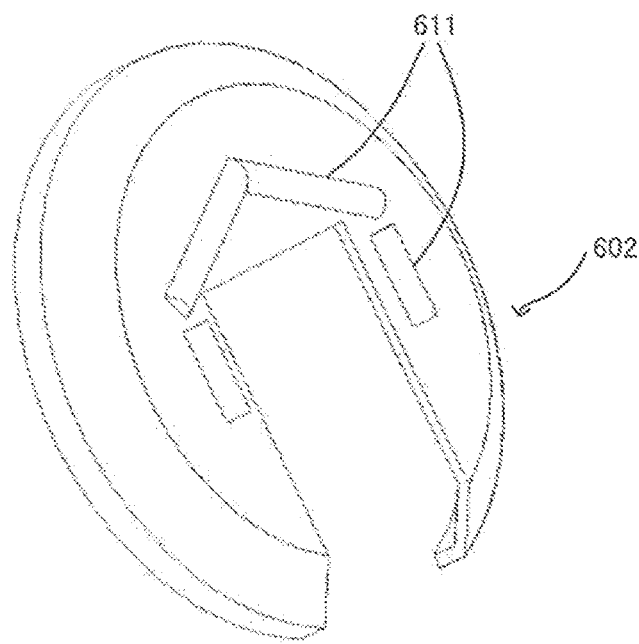
FIG. 5 is a schematic view showing a fourth modification of the rear cover shown in FIG. 1.

In a fourth modification of the rear cover 602, as shown in FIG. 5, a projection 611 on the upper part of the outer rear surface portion 603 comprises an inverted V-shaped first portion located above the turret mechanism portion 604 and straight second portions located individually on the left and right of the turret mechanism portion 604. The projection 611 has substantially the same function as that of the third modification of the rear cover 602 (FIG. 4).

Figure 6:
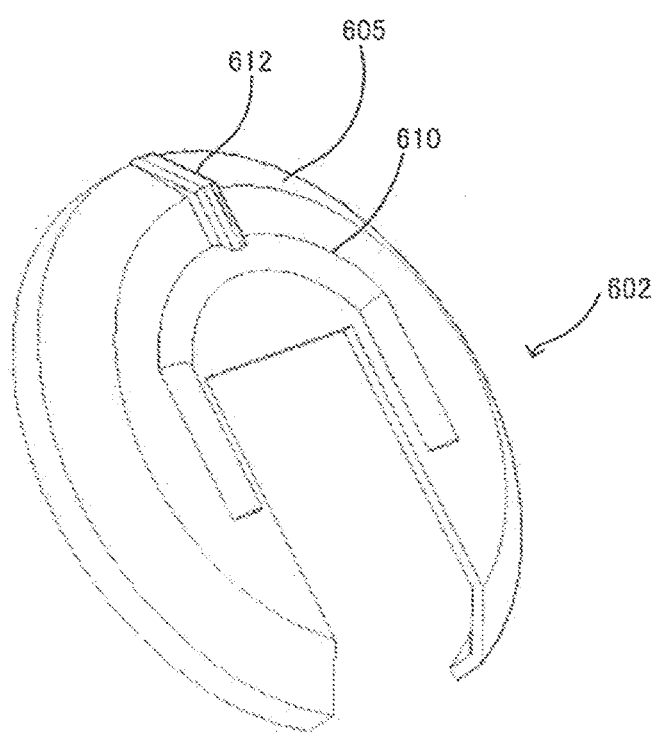
FIG. 6 is a schematic view showing a fifth modification of the rear cover shown in FIG. 1.

In a fifth modification of the rear cover 602, as shown in FIG. 6, a projection 612 is provided also on the truncated-cone portion 605 of the rear cover 602 shown in FIG. 4 (third modification). Specifically, the rear cover 602 is provided with an inverted U-shaped projection (first projection 610) identical to that shown in FIG. 4 on the upper part of the outer rear surface portion 603 and a projection (second projection 612) on the upper part of the truncated-cone portion 605. In this modification, chips and cutting fluid dropped on the truncated-cone portion 605 of the rear cover 602 are guided to the first projection 610 by a flow passage defined by the second projection 612 and then outwardly drop left and right from the central portion of the first projection 610. Thus, the chips and cutting fluid can be prevented from getting into the turret mechanism portion 604.

The projections 608 and 609 formed on the outer rear surface portion 603 of the rear cover 602 shown in FIGS. 2 and 3 are semicircular or square in cross-section. However, the cross-sections of these projections are not limited to such shapes and may also be of various other shapes, as shown in FIGS. 7A to 7H.

Figure 7A:
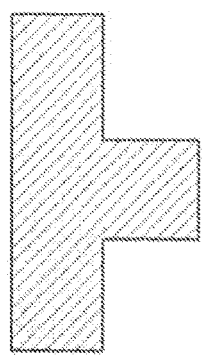
FIGS. 7A to 7H are views showing examples of cross-sectional shapes different from those of projections formed on the rear covers shown in FIGS. 1 to 6.
Figure 7B:
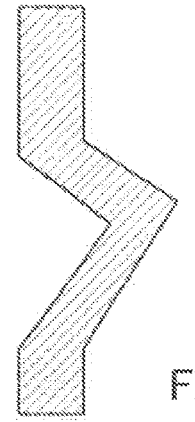
Figure 7C:
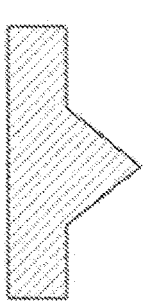
Figure 7D:
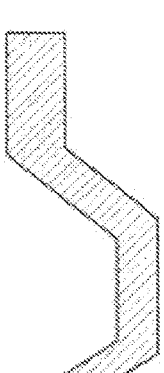
Figure 7E:
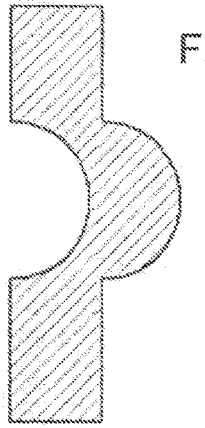
Figure 7F:
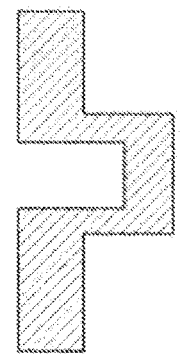
Figure 7G:
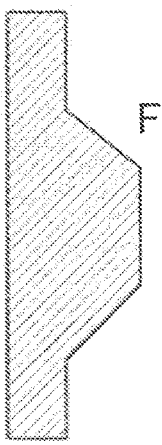
Figure 7H:
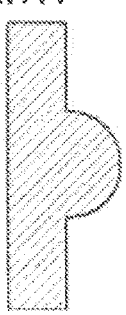

Projections shown in FIGS. 7A and 7F are shaped so that a portion having a square cross-section projects outward from a cover material. Projections shown in FIGS. 7B and 7C are shaped so that a portion having a triangular cross-section projects outward from a cover material. Projections shown in FIGS. 7D and 7G are shaped so that a portion having a trapezoidal cross-section projects outward from a cover material. Projections shown in FIGS. 7E and 7H are shaped so that a portion having a semicircular cross-section projects outward from a cover material. The projections of the various cross-sectional shapes shown in FIGS. 7A to 7H on the outer rear surface portion 603 of the rear cover 602, like the projections of the shapes shown in FIGS. 1 to 6, can prevent chips and cutting fluid from getting into the turret mechanism portion 604.

A second embodiment of the tool changer according to the present invention will now be described with reference to FIGS. 8 to 10.

Figure 8:
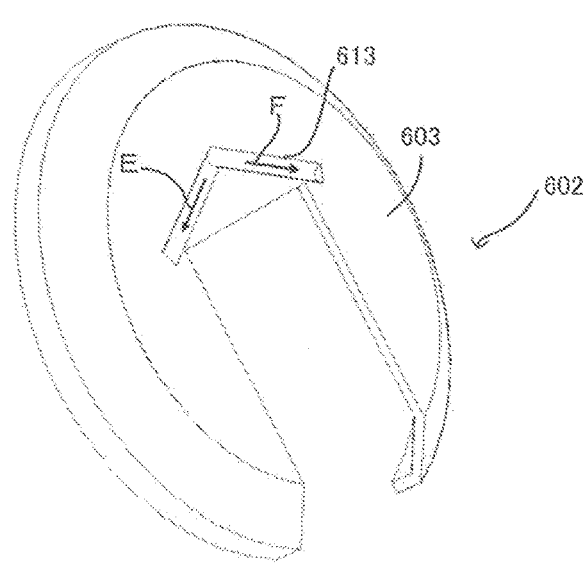
FIG. 8 is a schematic view showing an example of a rear cover constituting a turret of a second embodiment of the tool changer according to the present invention.

FIG. 8 is a view showing an example of a rear cover 602 constituting a turret of the second embodiment of the tool changer according to the present invention. A recess 613 is provided in an upper part of an outer rear surface portion 603 of the rear cover 602. The recess 613 is semicircular in cross-section, arranged so that its central portion is higher than its opposite end portions, and inverted V-shaped as a whole. Thus, chips and cutting fluid drop along a flow passage defined by the outer rear surface portion 603 and the recess 613 of the rear cover 602, as indicated by arrows E and F in FIG. 8, so that they can be prevented from getting into a turret mechanism portion 604. Also if the chips and cutting fluid are collected on an upper part of a truncated-cone portion 605 of the rear cover 602, in the tool changer of the type in which the turret 6 is swung during tool change, they drop along the passage indicated by arrows E and F in FIG. 8, so that they can be prevented from getting into the turret mechanism portion 604.

Figure 9:
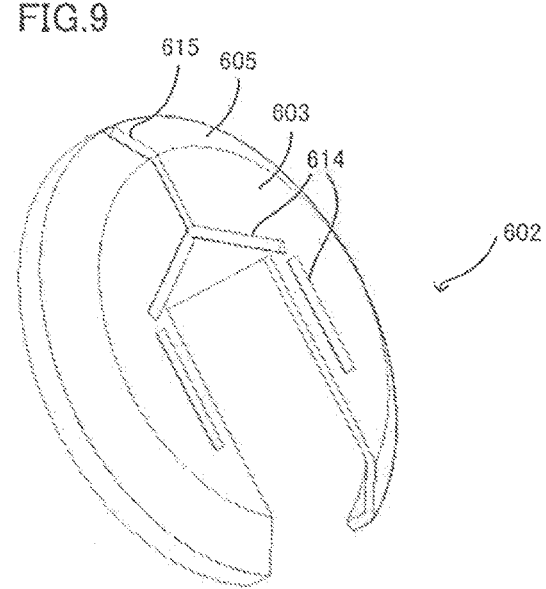
FIG. 9 is a schematic view showing a first modification of the rear cover shown in FIG. 8.

FIG. 9 shows a modification of the recess 613 shown in FIG. 8. A first recess 614, like the recess 613 of FIG. 8, is semicircular in cross-section, and comprises a first portion, which is arranged so that its central portion is higher than its opposite end portions and is inverted V-shaped as a whole, and straight second portions located individually on the left and right of the turret mechanism portion 604. Further, a second recess 615 is formed on the upper part of the truncated-cone portion 605 of the rear cover 602. In this modification, chips and cutting fluid dropped on the truncated-cone portion 605 of the rear cover 602 are guided to the first recess 614 by a passage defined by the second recess 615 and then drop outward from the central portion of the first recess 614. Thus, the chips and cutting fluid can be prevented from getting into the turret mechanism portion 604. Furthermore, a suitable modification may be made such that the first portion of the first recess 614, which is arranged so that its central portion is higher than its opposite end portions and is inverted V-shaped as a whole, and the straight second portions located individually on the left and right of the turret mechanism portion 604 are formed continuously with each other or that the second recess 615 of the truncated-cone portion 605 is omitted.

The recesses 613 and 614 formed in the outer rear surface portion 603 of the rear cover 602 shown in FIGS. 8 and 9 are semicircular in cross-section. However, the cross-sections of these recesses are not limited to this shape and may also be of various other shapes, as shown in FIGS. 10A to 10D.

Figure 10A:
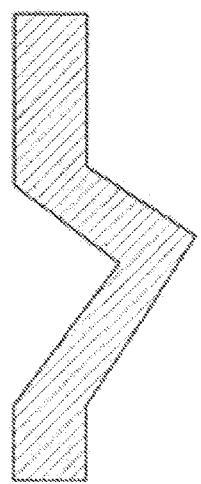
FIGS. 10A to 10D are schematic views showing a second modification of the rear cover shown in FIG. 8.
Figure 10B:
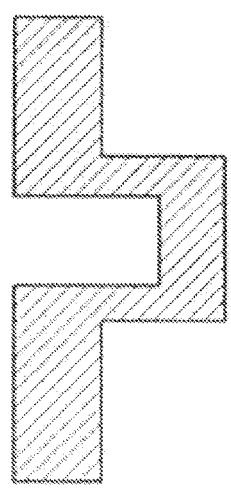
Figure 10C:
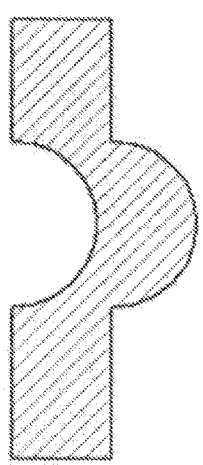
Figure 10D:
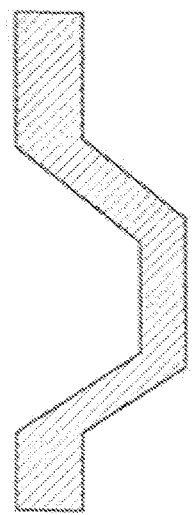
Figure 11:
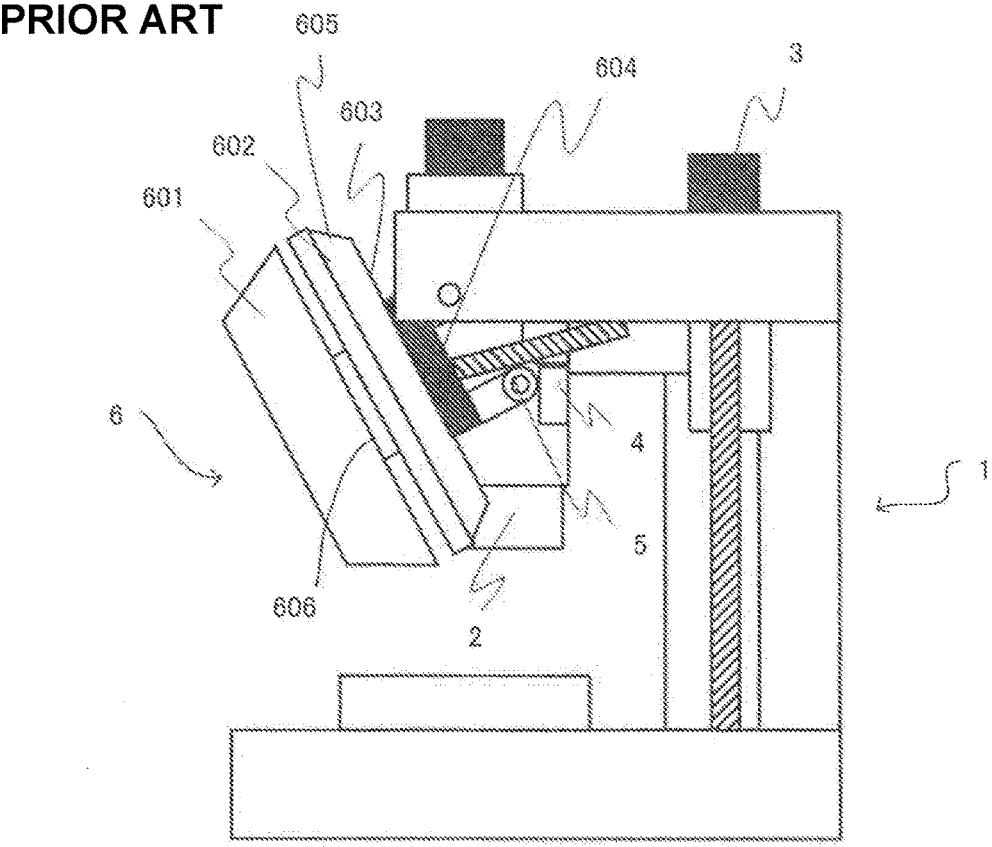
FIG. 11 shows an example of a conventional technique in which a tool changer comprising a turret with cover means is attached to a machine tool.

A recess shown in FIG. 10A is formed by inwardly extruding a portion having a triangular cross-section from a cover material. A recess shown in FIG. 10B is formed by inwardly extruding a portion having a square cross-section from a cover material. A recess shown in FIG. 10C is formed by inwardly extruding a portion having a semicircular cross-section from a cover material. A recess shown in FIG. 10D is formed by inwardly extruding a portion having a trapezoidal cross-section from a cover material. The recesses of the various cross-sectional shapes shown in FIGS. 10A to 10D in the outer rear surface portion 603 of the rear cover 602, like the recesses of the shapes shown in FIGS. 10A to 10D, can prevent chips and cutting fluid from getting into the turret mechanism portion 604.

In the embodiments and modifications described above, the projections or recesses that define the cutting fluid passages are provided in the upper part of or in the upper part and the left and right side portions of the outer rear surface portion 603 of the rear cover 602. However, in a case where another member is provided in the upper part of the outer rear surface portion 603, for example, chips and cutting fluid can be prevented from getting into the turret mechanism portion 604 by simply providing projections or recesses for passages at only the left and right side portions of the outer rear surface portion 603.

In above-described embodiments and modifications, moreover, only the projections or recesses are used as members that define flow passages. Alternatively, however, projections and recesses may be used in a mixed manner.

The invention claimed is:

1. A tool changer which comprises:
a turret with a plurality of grips for holding tools, wherein the turret is rotatable about a rotation axis to index a desired tool to change the tools;
a first cover which covers a first surface of the turret;
a second cover which comprises an outer surface portion and covers a second surface of the turret that is on an opposite side of the turret than the first surface;
a drive source configured to rotate the turret; and
a turret mechanism portion configured to transmit a force from the drive source to rotate the turret, wherein
the turret mechanism portion projects from the outer surface portion,
the outer surface portion of the second cover is formed with a projection or a recess,
the projection or the recess defines a flow passage at an upper side of the turret mechanism portion, the flow passage configured to guide debris so as to prevent the debris from getting into the turret mechanism portion, and
the flow passage has a central portion and opposite end portions, the opposite end portions located on opposite sides of the central portion and on opposite lateral sides of the rotation axis, and the central portion is higher than the opposite end portions.

2. The tool changer according to claim 1, wherein a cross-sectional shape of the projection or recess is semicircular, triangular, or square.

3. The tool changer according to claim 1, wherein
the outer surface portion of the second cover is formed with the projection, and wherein the projection is semicircular in cross-section,
and
the central portion defines, together with the opposite end portions, an inverted V-shape of the projection.

4. The tool changer according to claim 1, wherein
the outer surface portion of the second cover is formed with the projection, and wherein the projection has a semicircular cross-section,
and
the central portion defines, together with the opposite end portions, a curved shape of the projection.

5. The tool changer according to claim 1, wherein
the outer surface portion of the second cover is formed with the projection, and wherein the projection has a square cross-section, the central portion extends horizontally, and the opposite end portions are continuous with the central portion, and the opposite end portions define, together with the central portion, a trapezoidal shape of the projection.

6. The tool changer according to claim 1, wherein
the outer surface portion of the second cover is formed with the projection, and wherein the projection has an inverted-shape, and the projection encloses the upper, left, and right sides of the turret mechanism portion when viewed along the rotation axis.

7. The tool changer according to claim 1, wherein
the outer surface portion of the second cover is formed with the projection, and wherein the projection has
an inverted V-shaped first portion located above the turret mechanism portion, and
straight second portions located respectively on left and right sides of the turret mechanism portion when viewed along the rotation axis.

8. The tool changer according to claim 1, wherein
the outer surface portion of the second cover is formed with the projection, and wherein the projection has
a first, inverted U-shaped projection portion, and
a second projection portion on an upper part of the outer surface portion, and connected with the first projection portion.

9. The tool changer according to claim 1, wherein
the outer surface portion of the second cover is formed with the recess, and wherein the recess is semicircular in cross-section,
and
the central portion defines, together with the opposite end portions, an inverted V-shape of the recess.

10. The tool changer according to claim 1, wherein the outer surface portion of the second cover is formed with the recess, and wherein the recess includes
a first recess portion that is semicircular in cross-section, and includes
a first V-shaped portion and
second, straight portions located respectively on left and right sides of the turret mechanism portion as viewed along the rotation axis, and
the recess further includes a second recess portion formed on an upper part of the outer surface portion of the second cover.

* * * * *